US011976504B2

(12) United States Patent
Wanichsuksombat et al.

(10) Patent No.: US 11,976,504 B2
(45) Date of Patent: May 7, 2024

(54) SECURE LOCKING DEVICE FOR SLIDING DOORS AND WINDOWS

(71) Applicants: Jimmy S. Wanichsuksombat, Seattle, WA (US); Trinh T. Duong, Seattle, WA (US)

(72) Inventors: Jimmy S. Wanichsuksombat, Seattle, WA (US); Trinh T. Duong, Seattle, WA (US)

(*) Notice: Subject to any disclaimer, the term of this patent is extended or adjusted under 35 U.S.C. 154(b) by 281 days.

(21) Appl. No.: 17/511,492

(22) Filed: Oct. 26, 2021

(65) Prior Publication Data

US 2022/0127886 A1 Apr. 28, 2022

Related U.S. Application Data

(60) Provisional application No. 63/106,352, filed on Oct. 27, 2020.

(51) Int. Cl.
*E05C 19/00* (2006.01)
*E05B 65/08* (2006.01)

(52) U.S. Cl.
CPC ........ *E05C 19/003* (2013.01); *E05B 65/0888* (2013.01)

(58) Field of Classification Search
CPC ........................... E05C 19/003; E05B 65/0888
See application file for complete search history.

(56) References Cited

U.S. PATENT DOCUMENTS 3,318,047 A 5/1967 Carson
3,328,920 A 7/1967 Cohen et al.
3,471,189 A 10/1969 Ness
3,554,592 A 1/1971 Katz
3,797,005 A 3/1974 Schwarz
3,821,884 A 7/1974 Walsh
(Continued)

FOREIGN PATENT DOCUMENTS

ES 2318923 A1 * 5/2009 ............. E05C 17/56

OTHER PUBLICATIONS

"Mr. Goodbar, 22 in. to 32 in. Steel Patio Sliding Door Security Bar," homedepot.com. https://www.homedepot.com/p/Mr-Goodbar-22-in-to-32-in-Steel-Patio-Sliding-Door-SecurityBar-s700-PD-60/301458555?cm_mmc=Shopping-B-f_D30-b-D30-30_22_WINDOWS-GenericNA-Feed-PLA-NA-NA-%7c70000003386 7068%7c92700032244428625 [Date accessed: Nov. 6, 2019].

*Primary Examiner* — Michael P Ferguson
*Assistant Examiner* — Thomas L Neubauer
(74) *Attorney, Agent, or Firm* — Bold IP, PLLC; Binita Singh

(57) ABSTRACT

A device for placing in a sliding door or sliding window frame that adds additional security to prevent a sliding door or sliding window from being opened. The device is a secure locking device which comprises of a main bar and a lever bar that are connected to each other such that lever bar may pivot where it is connected to the main bar. The main bar is adjustable such that a length may be adjusted to allow the secure locking device to fit within varied sizes of sliding door/window frames. The secure locking device is also comprised of a locking mechanism that is controlled by a lever actuator and a lock button which are configured onto the main bar. The secure locking device is easily accessible by a user to lock and unlock in order to secure and unsecure the sliding door. The secure locking device is easy to position in a track of the sliding panel and does not require any need to secure into place.

28 Claims, 8 Drawing Sheets

(56) References Cited

U.S. PATENT DOCUMENTS

| | | | | | |
|---|---|---|---|---|---|
| 3,825,290 | A | | 7/1974 | Messina et al. | |
| 4,070,049 | A | * | 1/1978 | Brewer | E05C 19/004 292/338 |
| 4,073,522 | A | | 2/1978 | Tierney | |
| 4,302,038 | A | * | 11/1981 | Ervine | E05B 65/0888 292/263 |
| 4,429,912 | A | * | 2/1984 | Smith, Jr. | E05B 65/0888 292/263 |
| 4,541,202 | A | | 9/1985 | Dockery | |
| 4,570,985 | A | | 2/1986 | Waldo et al. | |
| 4,572,557 | A | * | 2/1986 | Taylor | E05B 65/0888 292/263 |
| 5,141,272 | A | * | 8/1992 | Veillette | E05B 65/0888 292/277 |
| 5,193,865 | A | | 3/1993 | Allenbaugh | |
| 5,685,582 | A | | 11/1997 | McCartney | |
| 6,070,918 | A | | 6/2000 | Calvache, Jr. | |
| 6,340,184 | B1 | * | 1/2002 | Kuzmich | E05B 65/0888 292/259 R |
| 6,382,689 | B1 | | 5/2002 | Brown | |
| 8,152,009 | B2 | | 4/2012 | Hulin | |
| 8,727,400 | B1 | * | 5/2014 | Marchand | E05B 65/0888 292/259 R |
| 11,098,498 | B2 | * | 8/2021 | Godwin | E05B 65/0888 |
| 2006/0150512 | A1 | | 7/2006 | Heithe et al. | |
| 2007/0039244 | A1 | | 2/2007 | Polston | |
| 2007/0209414 | A1 | * | 9/2007 | Bentley | E05B 65/0888 70/312 |
| 2008/0018118 | A1 | * | 1/2008 | Schultz | E05B 65/0888 292/259 R |
| 2015/0059422 | A1 | * | 3/2015 | Kao | E05B 73/0005 70/58 |
| 2017/0211297 | A1 | | 7/2017 | Godwin | |

* cited by examiner

SECURE LOCKING DEVICE FOR SLIDING DOORS AND WINDOWS

CROSS REFERENCE TO RELATED APPLICATION

This application claims benefit of U.S. Provisional Application No. 63/106,352 filed on Oct. 27, 2020, which is incorporated by reference in its entirety.

TECHNICAL FIELD

The overall field of this invention relates to devices for securing a sliding glass door or windows in a closed position and permitting easy unlocking by stepping on a lever.

BACKGROUND OF THE INVENTION

Sliding glass doors are a common feature in most homes. The sliding doors combine functionality and convenience as an entryway to accessing a patio, a deck, or a similar feature. Generally, the sliding doors, as the name suggests, slide upon a track to open or close. Another device that has combined a similar functionality are sliding windows where some designs also use a track to slide open and close just like a sliding door. However, sliding glass doors and windows such as these also have a drawback wherein, they can become an entryway for uninvited intruders. Usually, a lock or some form of latch is used to lock the door or window in place. Most times, the lock needs to be manually activated into the lock position. Vulnerability to unauthorized access lies when an individual forgets to lock the door or window, or the latches/locks are easily manipulated with the use of a pry bar.

Various attempts have been made to provide a device that provides some form of a secondary lock to prevent movement of the door or window. Commonly, a bar may be placed between the frame of the sliding frame of the sliding glass door or window and the opposing fixed frame. However, such a device would have to be manually picked up and moved out of the frame. Other devices that use telescoping arms may employ locking and unlocking with a foot and thus without bending or stooping but are physically mounted to the door or window frame with bolts or other means. Such a device may leave unsightly holes in the door frame when the device is removed. Accordingly, a need still exists for a security device which does not require physically connecting the device to a door or window frame and which can lock automatically once the sliding door or window is closed.

It is an object of the present invention to provide an improved, easy to use, affordable secondary locking device which can be used to lock a sliding door or sliding window. It is an object of the present invention to provide a means of automatically locking a sliding door or window when the door or window is slid to the closed position. It is also an object of the present invention to easily unlock the secondary device by pressing on a hinge with a person's foot, and thus preventing stooping over or bending to unlock the device. Other aspects and advantages of the present disclosure will become apparent upon consideration of the following detailed description.

SUMMARY OF THE INVENTION

Accordingly, the present disclosure recognizes the unsolved need identified above. The present disclosure is intended to be used as a security device for a sliding door or sliding window. The present disclosure recognizes the need for a strong security bar that can be adjusted to fit the doorway of a sliding door or sliding window. The present disclosure is also intended to be used as security device in the doorway of a sliding door or sliding window without using permanent attachment means to connect to a doorway or a window. The present disclosure is further intended to be used with a lever mechanism which can be used to unlock and lock the device via a user's foot adding ease along with more security.

One or more embodiments are provided below for a device that adds additional security to prevent a sliding door or sliding window from being opened. The device, referred to as a secure locking device herein, may be comprised of a main bar and a lever bar which are connected to each other and are intended to be placed within a track of a sliding door or sliding window frame to prevent the sliding door or sliding window from sliding open. The secure locking device may further comprise of a lever actuator and a lock button which may be integrated on the main bar. When a user depresses the lever actuator, the secure locking device is essentially unlocked and the sliding door or sliding window is free to slide. To lock the secure locking device, the sliding door/window must be returned to the closed position, and the lock button is depressed which releases the lever actuator to lock the secure locking device and in turn prevent the sliding door/window from sliding to an open position.

The lever bar may be the means by which the secure locking device would be actuated in the lock and unlocked position. The lever bar would be pivotally connected to the main bar in such a way that the lever bar would be prevented from pivoting at a connection point by a locking mechanism when the lever actuator is not actuated. When a user presses down on the lever actuator, the locking mechanism would be released, and the lever bar may pivot at the connection point and the secure locking device may be unlocked. When the secure locking device is unlocked, the sliding door may be slidable on the track and the secure locking device would thus track the door and slide up along the side of the door as the door is sliding on the track. To lock the secure locking device and prevent the lever bar from pivoting at the connection point, the sliding door is returned to a closed position with the secure locking device tracking the door down to rest in the sliding door track, and then the lock button is depressed activating the locking mechanism.

Other advantageous features as well as other aspects and advantages of the invention will be apparent from the following description and the appended claims.

DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1A:
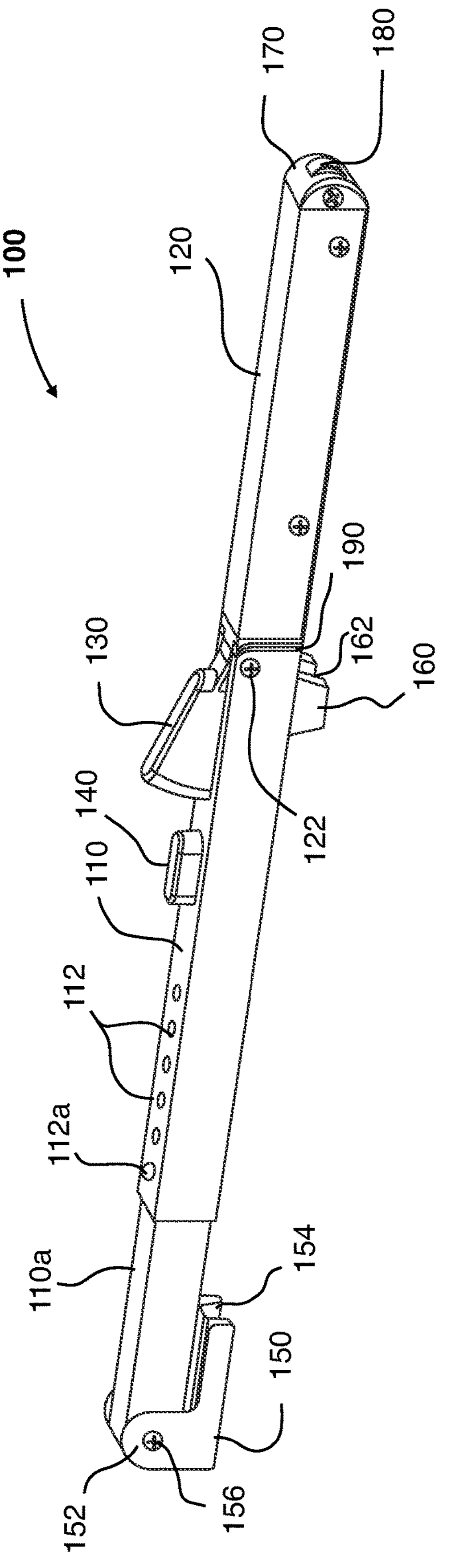
FIG. 1A illustrates a side perspective view of an embodiment of a secure locking device in locked position.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises," and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

The figures and the following written description describe a secure locking device which may be used with a sliding door or sliding window that includes a frame, a sliding panel that is slidable in the frame between an open and a closed position, and a fixed panel that is fixed and stationary within the frame. The disclosure will specifically refer to a sliding door for brevity, but it is to be understood that the secure locking device has utility for a sliding window also. The present disclosure of the secure locking device provides a means to secure and unsecure a sliding door in a closed or open position. The frame of a sliding door is comprised of a track, wherein the track comprises the means for sliding the sliding panel within the frame. The secure locking device may be described as a security device which may be placed within the track of the sliding door frame and prevent the sliding panel from sliding to an open position when the secure locking device is in the locked position. The secure locking device is placed in the track between the sliding panel and a frame section in front of the fixed panel. The secure locking device enables a user to manually unlock the secure locking device and allow the sliding door to be opened by sliding in the track, or manually lock the secure locking device and secure in the closed position thereby preventing the sliding door from sliding in the track of the frame.

Figure 1B:
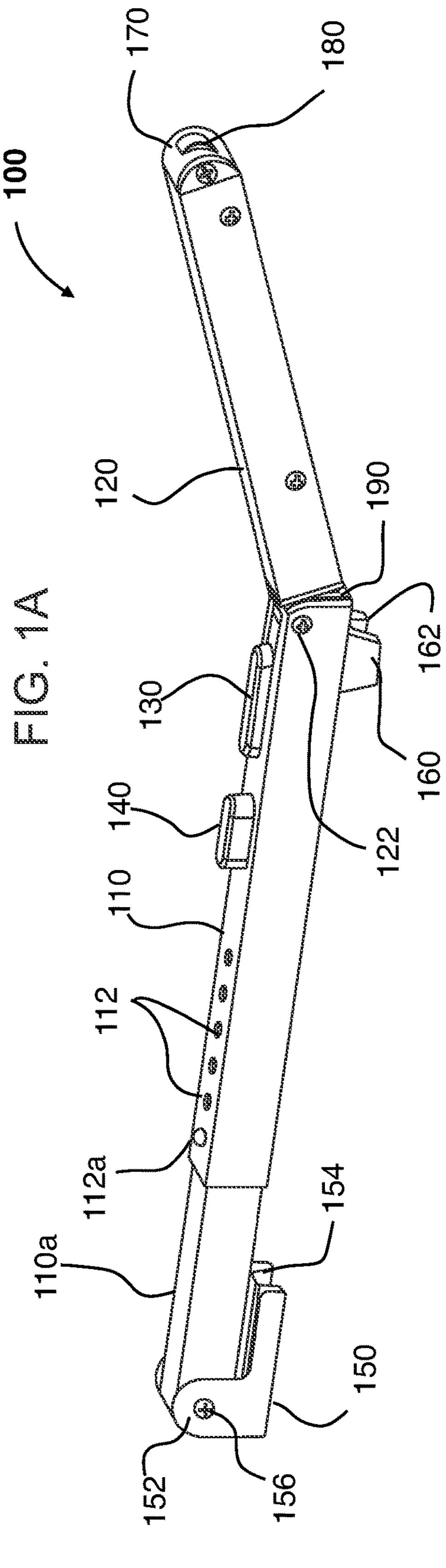
FIG. 1B illustrates the side perspective view of an embodiment of a secure locking device in an unlocked position with the lever bar at an upward angle.
Figure 5:
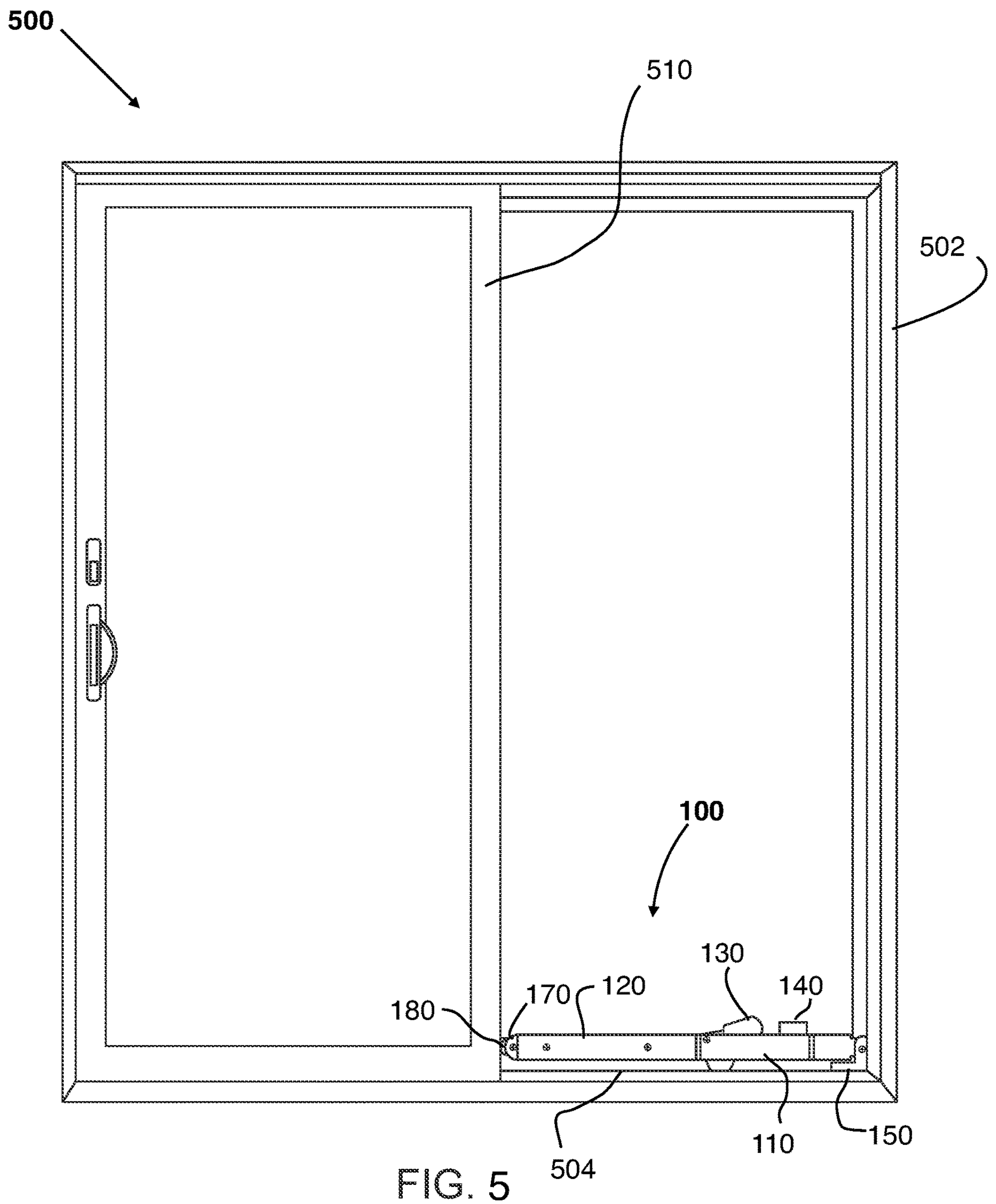
FIG. 5 is an environmental view of a sliding door with a secure locking device positioned within the track, and the secure locking device is in a locked position.
Figure 6:
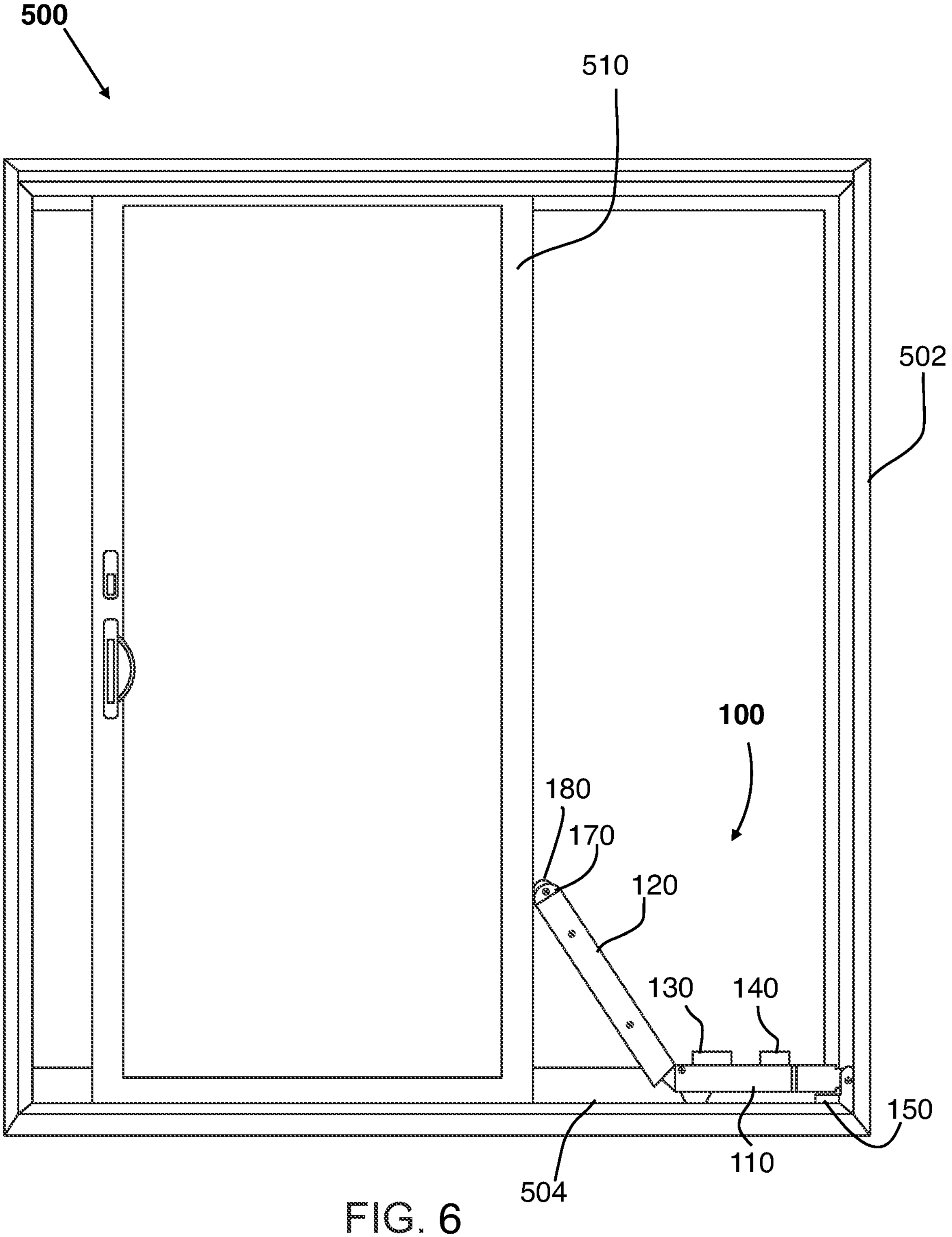
FIG. 6 is an environmental view of a sliding door with a secure locking device positioned within the track, and the secure locking device is in an unlocked position.
Figure 7:
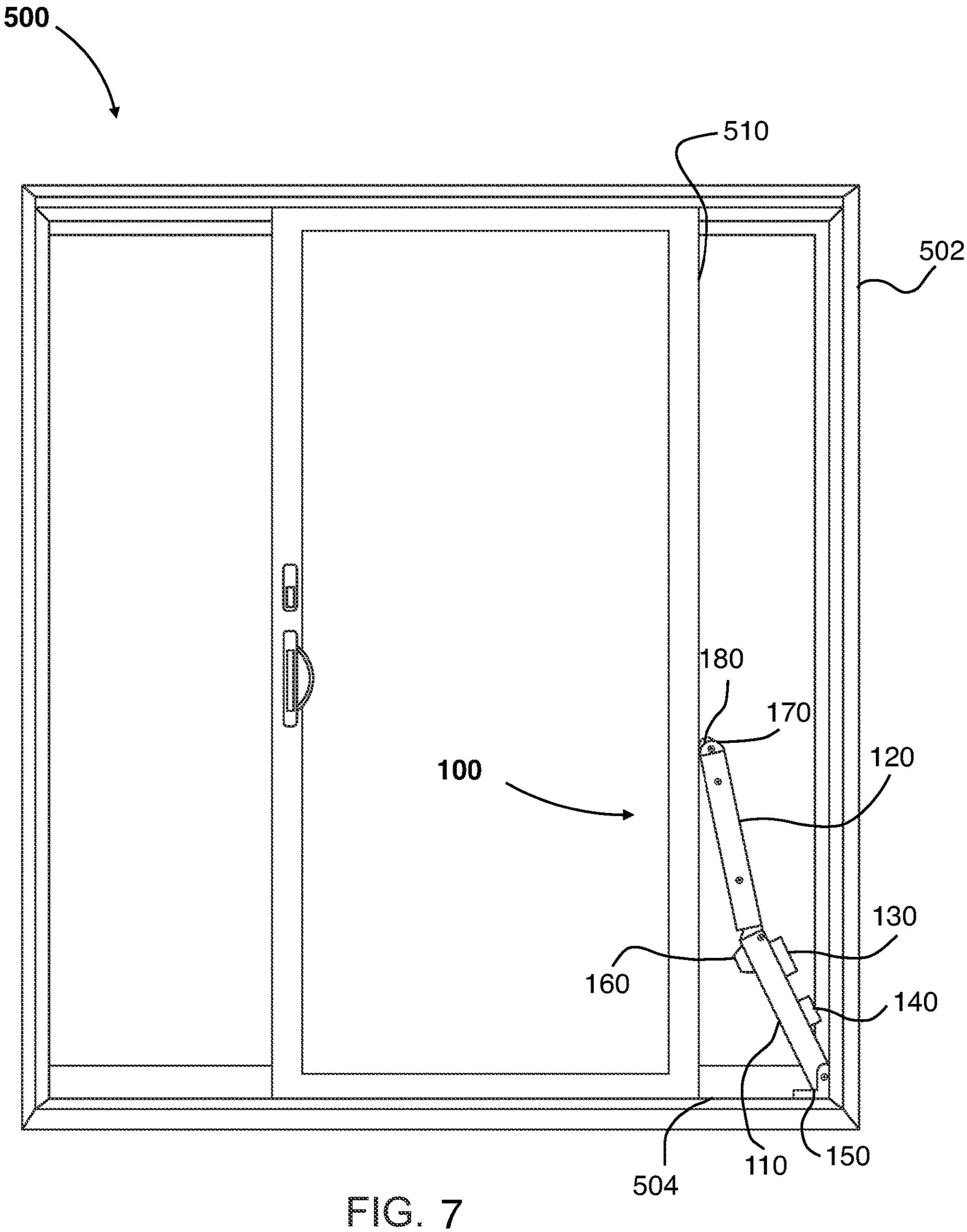
FIG. 7 is an environmental view of a sliding door with a secure locking device positioned within the track, and the secure locking device in an unlocked position with a sliding panel partially open.

FIG. 1A shows an example perspective view of a secure locking device 100 in a locked position. FIG. 1B shows an example perspective view of the secure locking device 100 in an unlocked position. FIG. 5 and FIG. 6 illustrate an environmental view of the secure locking device 100 and a sliding door 500. The secure locking device 100 is placed in a track 504 of a sliding door frame 502 with the secure locking device 100 in a locked and unlocked position, respectively. FIG. 7 illustrates an environmental view of the secure locking device 100 in the unlocked position and a sliding panel 510 of the door opened in the track 504.

Referring to FIGS. 1A and 1B, the secure locking device 100 may comprise a main bar 110, a lever bar 120, a lever actuator 130, a lock button 140, and a locking mechanism which is controlled by the lever actuator 130. As described in further detail below, the lever bar 120 is connected to the main bar 110. The lever bar 120 and the main bar 110 may each be described as a rigid object with a uniform cross-section smaller than its length that allows them to be positioned within and sit securely within the track 504 of a sliding door frame 502 (see, FIG. 5). It is also to be understood that the main bar 110 and the lever bar 120 may also have any cross-sectional shape including and not limited to a square, a rectangle, a triangle, a circle, and any polygon. Ideally, both the main bar 110 and the lever bar 120 may have the same cross-sectional shape, however it is also to be understood that the cross-sectional shapes may differ.

The lever actuator 130 and the lock button 140 comprise part of the locking mechanism. The lever actuator 130 and the lock button 140 may be integrated onto the main bar 110 and when pressed on are intended to unlock and lock the secure locking device 100, respectively. Further illustrated in the figures, secure locking device 100 may also comprise a hinge base 150, a bumper 160, an endcap 170, and a roller 180. As seen in the figures, the hinge base 150 may be connected to the main bar 110 and may be configured to ensure that the secure locking device 100 is properly positioned within the track 504 of the sliding door frame 502 and stays in place when the secure locking device 100 is unlocked and moves along with the sliding panel 510 of the sliding door 500. Additionally, the bumper 160 may be integrated to a bottom surface of the main bar 110 to permit the secure locking device 100 to securely sit within the track 504 of the sliding door frame 502 and may further add some cushion to protect the secure locking device 100. The end cap 170 and the roller 180 may be connected to the lever bar

120 and allow a smooth movement of the secure locking device along the sliding door panel as the sliding door is moved between a closed and opened position.

Still referring to FIGS. 1A and 1B, the main bar 110 may be adjustable such that a length of the main bar 110 may be adjustable to allow the secure locking device to fit within varied sizes of sliding door frames (also varied sizes of window frames). The main bar 110 may include an adjustable bar 110*a* that allows the length of the main bar 110 to be adjusted. The main bar 110 may be a hollow piece and is designed such that the adjustable bar 110*a* slidably fits within the main bar 110. The adjustable bar 110*a* may also be a rigid object with a uniform cross-section smaller than its length. The adjustable bar 110*a* may have a cross-section that corresponds in shape to the cross-section of the main bar 110 and having a cross-sectional shape sized relatively smaller making it possible to perform the task of sliding the adjustable bar 110*a* within the main bar 110 to extend or retract.

FIGS. 1A and 1B also illustrate an example of the mechanism that may be used with the adjustable bar 110*a* to telescope within the main bar 110 to adjust the length to securely fit the secure locking device 100 within a sliding door frame. The main bar 110 may be configured with a plurality of holes 112 on a top surface. As used herein, the top surface is intended to denote a surface of the main bar 110 that is opposite the bottom surface of the main bar 110, wherein the bottom surface faces downward and may rest on the track of the sliding door frame. The adjustable bar 110*a* may be configured with a spring-loaded release button 112*a* on a top surface, which engages with the plurality of holes 112 on the main bar 110 to allow the length of the main bar to be adjusted. The plurality of holes 112 may be spaced apart in equal increments and may be in the range of ½ inch to 1-inch increments. It is also to be understood that other means of adjusting the length of the main bar 110 are within this disclosure. It is also to be understood that the adjustment means may alternatively be configured on the lever bar 120 or may be configured on both the main bar 110 and the lever bar 110. An example of an alternate adjustment means may include and not be limited to a knob (not shown) that traversers through the main bar 110 which may be loosened to allow the adjustable bar 110*a* to move within the main bar 110 and tightened to lock in a position and prevent the adjustable bar 110*a* from moving.

Figure 2:
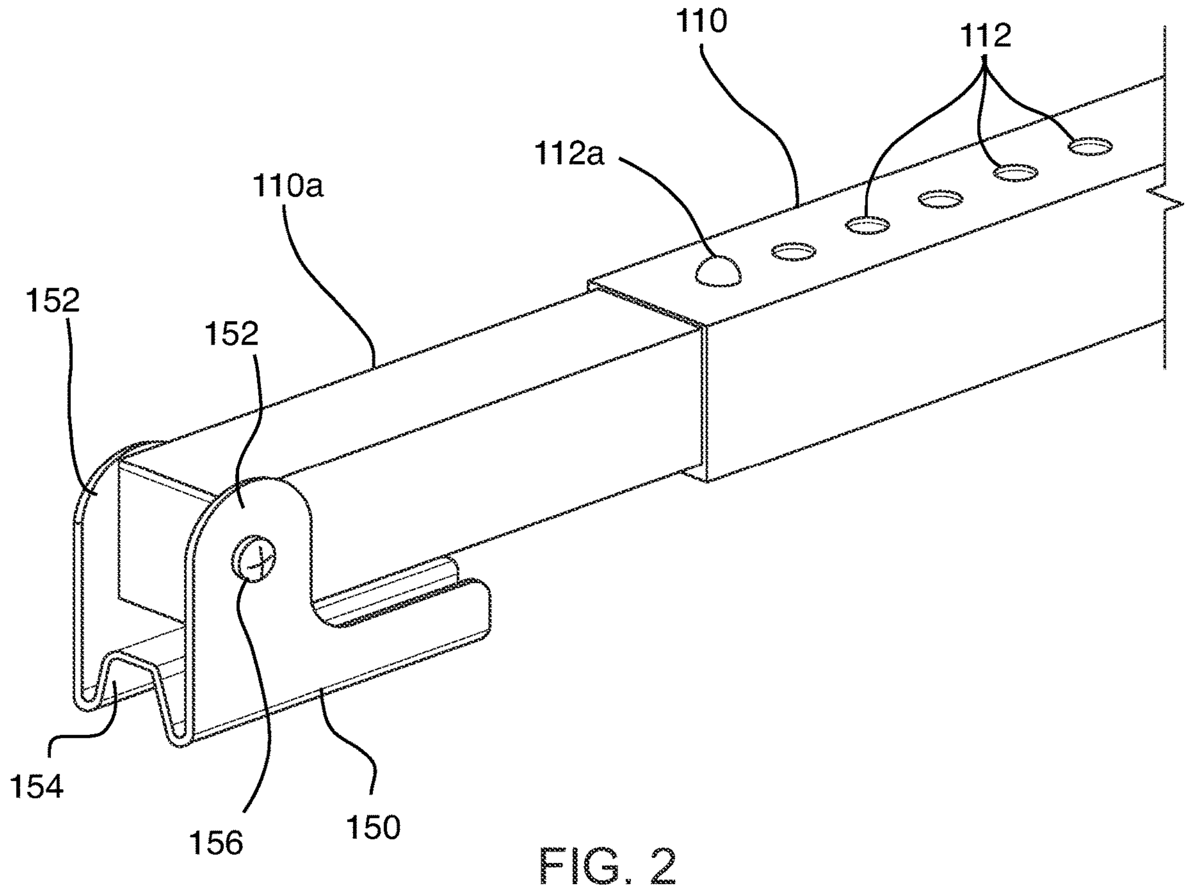
FIG. 2 is a close-up view of a main bar with the adjustable bar allowing for a length of the main bar to be adjusted.

As seen in FIGS. 1A, 1B, and 2, the hinge base 150 is connected to the main bar 110, and more specifically the hinge base 150 is connected to the adjustable bar 110*a*. Specifically, the hinge base 150 is connected to an end of the adjustable bar 110*a* that is opposite an end that slides into the main bar 110. The hinge base 150, as the name suggests, may be connected to the adjustable bar 110*a* via a hinge 156 such that the adjustable bar 110*a* may pivot upward at the hinge base 150. The pivoting motion at the hinge base 150 allows the secure locking device 100 to track upward to a relatively vertical position. When the secure locking device 100 is positioned within a track 504 of the sliding door frame 502 (see FIG. 5 through FIG. 7), the pivoting motion at the hinge base 150 would allow the secure locking device 100 to track upward once the secure locking device 100 is unlocked.

Also best seen in FIG. 2, the hinge base 150 may be a relatively small flat piece that is designed to be positioned and rest on the track of the sliding door (see FIG. 5). The hinge base 150 may have a width that is relatively similar to a width of the main bar 110 and have a length that may be in the range of 3 inches to 6 inches. The length of the hinge base 150 can affect the extent a sliding door can be opened as the hinge base 150 remains in a track of a sliding door as a sliding panel is opened. Additionally, the hinge base 150 has a pair of parallel supports 152 that jut upward from the flat piece to connect with the adjustable bar 110*a* at the hinge 156. The connecting end of the adjustable bar 110*a* is placed between the pair of parallel supports 152 and pivotally connected at the hinge 156.

Once the adjustable bar 110*a* is pivotally connected to the parallel supports 152, a bottom surface of the adjustable bar 110*a* may abut against and rest on a top surface of the flat piece of the hinge base 150. It is also to be understood that the bottom surface of the adjustable bar 110 may not directly abut against the top surface of the hinge base but may be relatively close in proximity. A channel 154 is configured on to a bottom surface of the hinge base 150, wherein the bottom surface touches a track of a sliding door. The channel 154 is provided so that hinge base 150 may clear any rails that may be configured on a track of the sliding door frame. It is to be understood that the hinge base 150 may also be configured without a channel such as to offer an option for users who's sliding doors may not have a rail configured in a track.

Figure 3A:
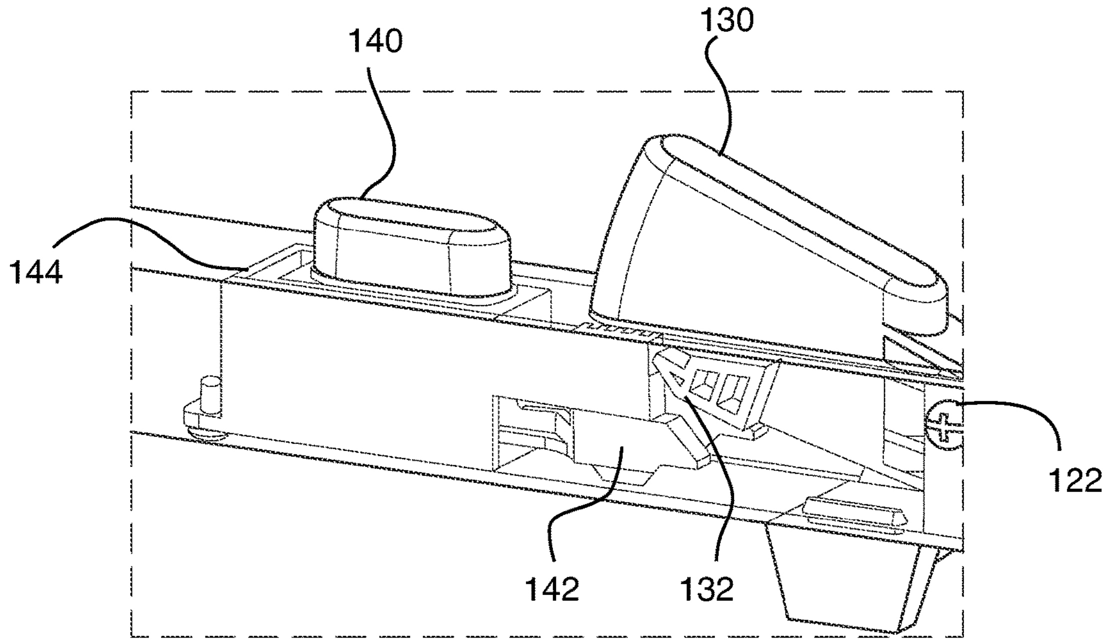
FIG. 3A is a close-up view of a section of the main bar with the lock button and the latch lever illustrating a partial internal view of the locking mechanism with the lever actuator in a locked position.
Figure 3B:
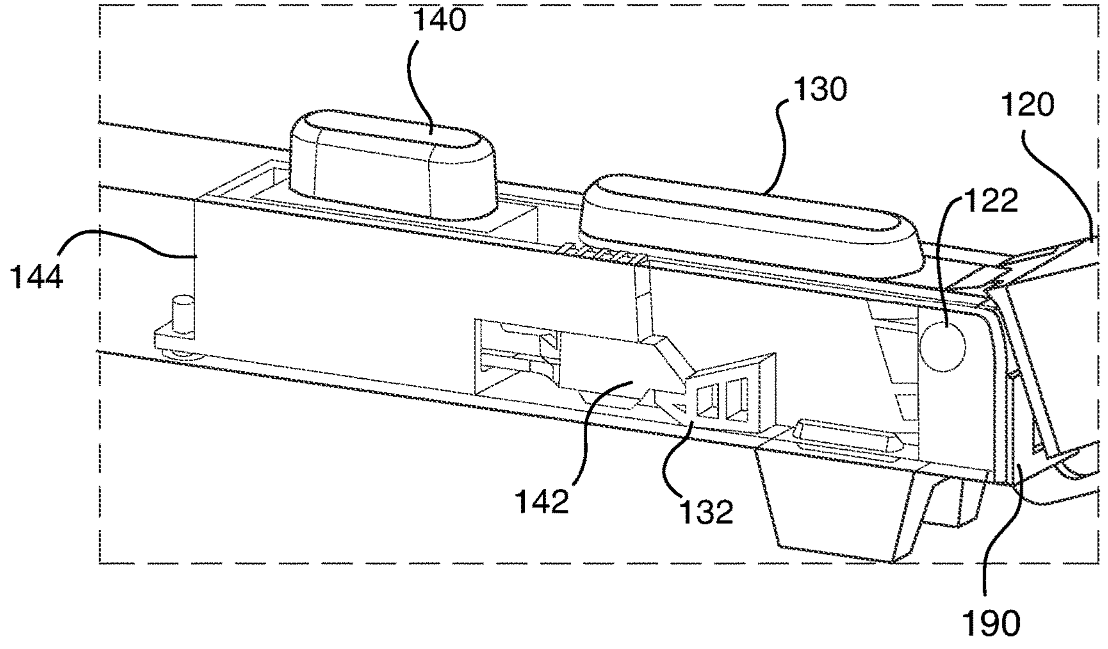
FIG. 3B is a close-up view of a section of the main bar with the lock button and the latch lever illustrating a partial internal view of the locking mechanism with the lever actuator in an unlocked position.

The bumper 160 also comprises the secure locking device 100 and may also help align and place the secure locking device 100 within a track of a sliding door frame. The bumper 160 may be configured on a bottom surface of the main bar 110 relatively close to an end that is connected to the lever bar 120. The bumper 160 and the base hinge 150 together stabilize the secure locking device 100 within or on a track of a sliding door frame. As best seen in FIGS. 1A, 1B, and 3B, a channel 162 is also configured into the bumper 160 such that the bumper 160 may clear any rails configured in a track of a sliding door. It is also to be understood that the bumper 160 may not be configured with a channel such as to provide an option for users whose sliding doors do not have a rail system in a track of a sliding door. The bumper 160 also provides a cushioning system for the secure locking device 100 when a sliding panel of a sliding door is returned to a closed position and the secure locking device is lowered. Additionally, the bumper 160 also provides a protective surface which rests in a track of a sliding door to prevent constant friction of opening and closing a sliding door from damaging either the secure locking device 100 or a track of the sliding door.

It is also to be understood that more than one bumper 160 may comprise the secure locking device. More than one bumper 160 may be configured onto the main bar 110 to provide additional stability. It may be contemplated that a bumper may also be configured onto a bottom surface of the lever bar 120. Further, it is also to be understood that the bumper 160 may only be configured on the lever bar 120 or any combination thereof. The bumper 100 may be fashioned from a material that provides some cushioning and does not cause friction, such as and not limited to rubber.

FIGS. 1A and 1B illustrate that the lever actuator 130 and the lock button 140 may be integrated into the main bar 110 which function to engage and disengage a locking mechanism. The lever bar 120 is connected to the main bar 110 through the lever actuator 130. The lever actuator 130 is pivotally connected to the main bar 110 at a connection point 122 such that the lever actuator 130 may pivot at the connection point which in turn would pivot the connected lever bar 120. In the one or more non-limiting embodiments of the secure locking device 100 described herein, the lever bar 120 may be the means by which the secure locking device 100 would be actuated in the locked and unlocked position. As seen in FIG. 1A, when the secure locking device 100 is in the locked position, the lever bar 120 is straight and relatively in line with the main bar 110. As seen in FIG. 1B, when the secure locking device 100 is in the unlocked position, the lever bar 120 is angled slightly upward. The lever actuator 130 may be pivotally connected to the main bar 110 in such a way that the lever bar 120 would be prevented from pivoting at the connection point 122 by the locking mechanism (discussed below) when the lever actuator 130 is not actuated. When a user presses down on the lever actuator 130, the locking mechanism would be released, and the lever bar 120 may pivot upward at the connection point 122 and the secure locking device 100 may be considered unlocked. FIG. 1B illustrates the lever bar 120 positioned at an angle demonstrating that the locking mechanism has been deactivated and the lever bar 120 may pivot at the connection point 122. When the secure locking device 100 is unlocked, the sliding door may be slidable on the track and the secure locking device 100 would thus track and slide up along the side of the sliding panel as the sliding panel is slid on the track. To lock the secure locking device 100 and prevent the lever bar 120 from pivoting at the connection point 122, the sliding door is returned to a closed position with the secure locking device 100 tracking the sliding panel down to rest in the sliding door track, at which point the lock button 140 may be depressed activating the locking mechanism.

Additionally, the secure locking device 100 may also comprise a cushion element, such as a cushion pad 190 between the main bar 110 and the lever bar 120. As best seen in FIG. 3B, the cushion pad 190 may be attached to a flat surface of the main bar 110 proximal the connection point 122 which may come in contact with the lever bar 120. The cushion pad 190 may be provided to cushion both the lever bar 120 and the main bar 110 as the lever bar 120 pivots upward and downward. The cushion pad 190 may be fashioned from any material that provides some padding or cushion, including and not limited to rubber and felt. It is to be understood that the cushion pad 190 may be attached to the lever bar 120 or both the main bar 110 and the lever bar 120 or not include a cushion pad 190.

Figure 3C:
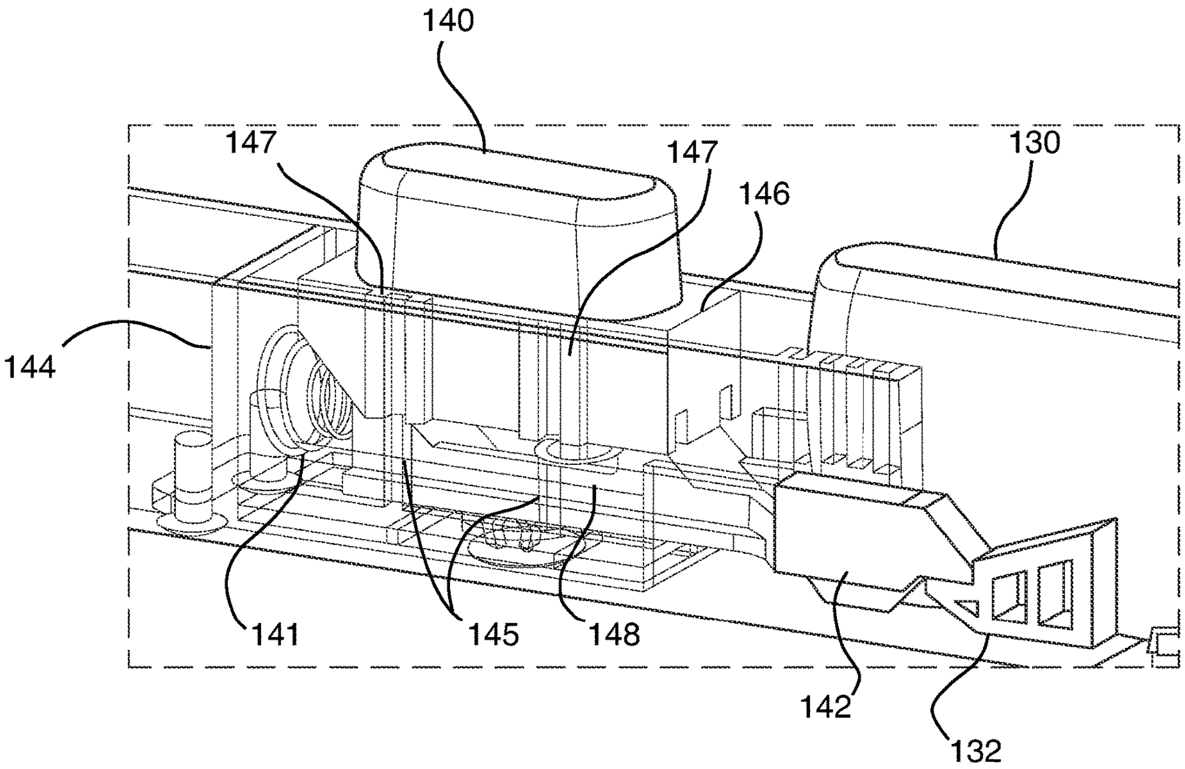
FIG. 3C is a close-up internal view of the main bar with the lock button illustrating some of the features of the locking mechanism.

The lever actuator 130 and the lock button 140 comprise the locking mechanism of the secure locking device 100. The lever actuator 130 and the lock button 140 are configured to fit within the main bar 110 and are relatively proximal to each other. The lever actuator 130 and the lock button 140 are designed to engage with each other. FIGS. 3A through 3C illustrate a non-limiting embodiment of the locking mechanism that may be integrated into the secure locking device 100. FIG. 3A illustrates an internal view of the main bar 110 depicting the locking mechanism engaged and in a locked position. FIG. 3B illustrates the internal view of the main bar 110 depicting the locking mechanism disengaged and in an unlocked position. FIG. 3C illustrates the internal view of the main bar 110 with the locking mechanism and some features that may aid in keeping the locking mechanism functioning stably.

The lever actuator 130 is integrated to the lever bar 120 at the connection point 122 in such a way that the lever bar 120 and the lever actuator have a seamless connection. Alternatively, the lever actuator 130 may be configured with the lever bar 120 as one piece, wherein the lever actuator 130 would be an extension of the lever bar 120 from the connection point 122. In both non-limiting embodiments, the lever actuator 130 and the lever bar 120 would have a slight bend at the connection point 122 such that when the lever bar 120 is horizontally placed on a surface, the lever actuator 130 would be angled slightly upward, and vice versa. In other words, the lever bar 120 and the lever actuator 130 are connected in such as way so as not to lay in the same plane allowing the lever bar 120 and the lever actuator 130 to move relative to each other in a seesaw motion. The angled connection allows the locking mechanism to function properly as configured.

The lever actuator 130 may be integrated with one or more latches 132. As seen in the figures, the lever actuator 130 is integrated with a first latch 132 on a visible side of the figure, and it is to be understood that the opposite side of the lever actuator 130 may also be integrated with a second latch 132. It should be noted that alternatively, only one side of the lever actuator 130 may be integrated with a latch 132. The latch 132 is designed to engage with a latch slider 142 which is integrated onto the lock button 140. As seen in FIG. 3A, the latch 132 is not engaged with the latch slider 142 and the lever actuator 130 is holding the lever bar 120 in a locked position wherein the lever bar 120 is not angled upward at the connection point 122, and further preventing a sliding door from opening. As seen in FIG. 3B, when the lever actuator 130 is depressed, the latch 132 hooks under the latch slider 142 and is held in place. In this position, the lever bar 120 pivots up from the connection point 122 and is angled upward allowing a sliding door to be opened. To lock the secure locking, the lever bar 120 needs to be lowered back down which is achieved by depressing the lock button 140.

Figure 3D:
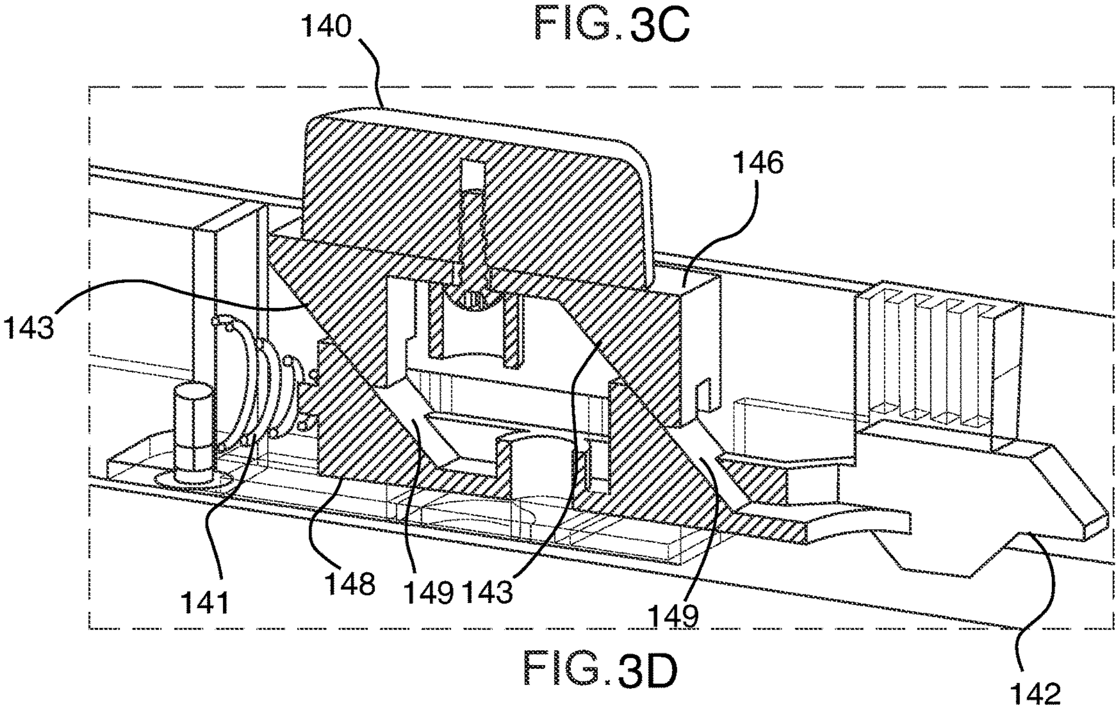
FIG. 3D is partial cut view of the lock button to illustrate the alignment of the lock button features.

The lock button 140 comprises of a housing 144 and two sliding pieces, a first sliding piece 146 and a second sliding piece 148 which is engagingly positioned below the first sliding piece 146. The housing 144 may have a structure that includes two side walls and a back wall, wherein the first and second sliding piece 146, 148 are enclosed between the two side walls, the back wall, and the lever actuator 130. As seen in the figures, the lever actuator 130 is opposite the back wall of the housing 144 to form a sort of enclosure. The first sliding piece 146 and the second sliding piece 148, as the name suggests, have a sliding motion attributed to them. The first sliding piece 146 moves upward and downward within the housing 144. As best seen in FIG. 3C, the side walls of the housing 144 have one or more tracks 145 configured in a vertical line from a top of the side wall to a bottom of the side wall. FIG. 3C illustrates two tracks 145 that are spaced apart and parallel to each other. It is to be understood that the side wall not visible in the figures also has similar tracks 145. The first sliding piece 146 has one or more guide rails 147 that correspond with and interact with the one or more tracks 145 on the side wall. The guide rails 147 essentially ride on the one or more tracks 145 and allow the first sliding piece 146 to move upward and downward on the one or more tracks 145. It should be noted that the first sliding piece has corresponding guide rails 147 on the other side not visible in the figures. The second sliding piece 148 is positioned below the first sliding piece 146 and engages with the first sliding piece 146 by sliding back and forth. FIG. 3D illustrates a side cut view of the lock button 140 demonstrating how the first sliding piece 146 and the second sliding piece 148 engage with each other. The second sliding piece 148 has one or more actuation ramps 149, which are inclined planes configured on the second sliding piece 148. The first sliding piece 146 also has one or more guide ramps 143 that correspond in incline to the one or more actuation ramps 149 such that the one or more guide ramps 143 slide down the one or more actuation ramps 149. As the one or more guide ramps 143 slide down the one or more actuation ramps 149, the second sliding piece 148 is pushed backward to accommodate and make room for the first sliding piece 146 moving downward.

The lock button 140 also comprises of the latch slider 142. In particular, the second sliding piece 148 is configured with the latch slider 142 on a side proximal to the lever actuator 120. As mentioned earlier, the latch 132 of the lever actuator 130 and the latch slider 142 engage with each other to lock and unlock the secure locking device by preventing or allowing the lever bar 120 to pivot to an upward angle. A compression spring 141 is connected to the second sliding piece 148 and the back wall of the housing 144. When the second sliding piece 148 slides backward toward the backwall of the housing 144, a load is put on the compression spring 141 by shortening it, and the compression spring 141 pushes back against the second sliding piece 148 to get back its original length. When the lever actuator 130 is depressed, the latch 132 pushes down on the latch slider 142 moving the second sliding piece 148 backward till the latch 132 slips under the latch slider 142. When the latch 132 slips under the latch slider 142, the compression spring 141 moves the second sliding piece 148 forward and causes the latch 132 to hook under the latch slider 142. Depressing the lever actuator 130 pivots the connected lever bar 120 at the connection point 122 moving the lever bar 120 at the upward angle. In this position the secure locking device 100 is unlocked and held in place by the latch 132 hooked under the latch slider 142.

To lock the secure locking device 100, the lock button 140 may be depressed. Depressing the lock button 140 may move the first sliding piece 146 downward guided by the one or more guide rails 147 on the one or more tracks 145 as this movement moves the second sliding piece 148 backward. As the second sliding piece 148 with the latch slider 142 moves backward, the latch 132 on the lever actuator 130 unhooks from the latch slider 142. This in turn pivots the lever actuator 130 upward at the connection point 122 and thus lowering the lever bar 120. The first sliding piece 146 moves downward as the one or more actuation ramps 149 on the second sliding piece 148 moving backward guide the downward movement with the aligned one or more guide ramps 143 on the first sliding piece 146. When the pressure on the lock button 140 is released, the compression spring 141 pushes back against the second sliding piece 148 which slides forward and the one or more actuation ramps 149 in turn push against the one or more guide ramps 143 to move the first sliding piece 146 upward. The first sliding piece 146 moves upward guided by the one or more guide rails 147 on the one or more tracks 145.

The above is an example of a locking mechanism that can be integrated into the secure locking device 100. It is to be understood that other means of locking and unlocking the secure locking device may be configured within the main bar 110 of the secure locking device.

Figure 4:
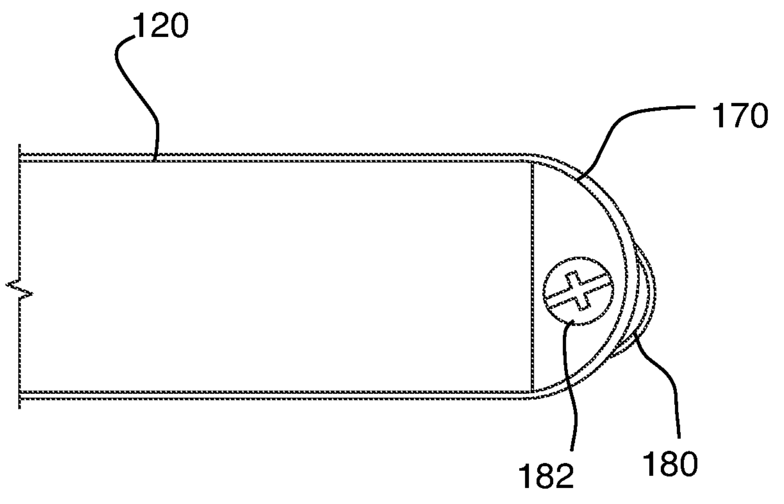
FIG. 4 is a close-up view of the lever bar with an endcap and roller.

Referring to FIGS. 1A, 1B, and 4 through 7, the lever bar 120 is designed to move up along a side of a sliding panel 510 of a sliding door frame 500. To allow an ease of such movement, the endcap 170 with the roller 180 is attached to an end of the lever bar 120 which is opposite the end that is connected to the lever actuator 130. The end of the lever bar 120 with the endcap 170 and the roller 180 abuts against the sliding panel 510. The endcap 170 may be a piece that goes on or slips into the lever bar 120. The endcap 170 may have a curved shape to allow a smooth movement of the lever arm 120 up the sliding panel 510. The end cap 170 may also be configured with a recessed portion which is designed to accommodate the roller 180. As best seen in FIG. 4, the recessed section in the end cap 170 is slightly off center toward a lower part of the end cap 170 so that the connected roller 180 is also slightly off center. In the off-center position, the roller 180 is constantly in contact with the sliding panel 510 as the sliding panel is moving and stays in contact even when the secure locking device 100 has moved upward to a relatively vertical position. The roller 180 adds a smooth and seamless sliding movement on the sliding panel 510. The roller 180 may be attached to the end cap 170 within the recessed area with an axel hardware 182. It is to be understood that the endcap 170 may not be configured with a recessed area and therefore the secure locking device 100 may not include a roller 180. In such an embodiment, the endcap 170 may be integrated or be capable of attaching to a soft material such as felt to allow smooth movement along a sliding panel 510.

In FIG. 5 the secure locking device 100 is shown placed within the track 504 of the sliding door frame 502 and is shown positioned in the locked position securing the sliding door 500. The secure locking device 100 may be adjusted to fit within the sliding door frame 502 by adjusting the length of the main bar 110 and the adjustable bar 110*a*. The secure locking device 100 is positioned such that the end cap 170 with the roller 180 are touching the sliding panel 510 and the base hinge 150 connected to the main bar 110 is placed against the sliding door frame 502 opposite the sliding panel 510. In the locked position, the lever bar 120 is not angled upward and thus the sliding panel 510 may not slide to open. To unlock the secure locking device 100, a user may press on the lever actuator 130 wherein the locking mechanism within the main bar 110 would be disengaged and the lever bar 120 may pivot upward into an unlocked position. FIG. 6 illustrates the lever bar 120 pivoted upward. This indicates that the secure locking device 100 is unlocked and the user may slide the sliding panel 510 to open. As the sliding panel 510 is moved in the sliding door track 504 to open, the secure locking device 100 in the sliding door track 504 also moves upward. FIG. 7 illustrates the secure locking device 100 angled upward along with the sliding panel 510. The secure locking device 100 is guided upward with the roller 180 moving upward along the sliding panel 510 and the main bar 110 pivoting at the base hinge 150. To lock the secure locking device 100 and secure the sliding door 500, the sliding panel 510 may be slid back to the closed position (shown in FIG. 5) while the secure locking device 100 slides back into the track 504. When the secure locking device 100 is positioned back in the track 504, the user may depress the lock button 140 to move the lever bar 120 back downward into the lock position.

The secure locking device 100 may also be augmented with additional features. One such feature may be an alarm system that sends out an alert if the secure locking device has been moved. The alarm may be WIFI enabled wherein the user may be alerted if the secure locking device is moved such as may be the case of the sliding panel is moved along the track. An associated application may be used with a personal electronic device that can be used in conjunction with the secure locking device that is augmented with electronic features. The application may receive notifications about a status of the secure locking device 100 which may include and not be limited to, an alarm, whether the secure locking device is locked or unlocked, and more. Additionally, the secure locking device 100 may also be locked and unlocked via WIFI connection.

Accordingly, the present description provides one or more embodiments for a useful, improved, easy to use secure locking device which may be used to add additional security to a sliding door or window to ensure the sliding panel may not be opened till the secure locking device is unlocked. Essentially, the sliding panel on the sliding door is incapable of being opened till the secure locking device is unlocked. The secure locking device is designed to be placed in a sliding door or sliding window frame. The secure locking device is unlocked by a user stepping on the lever actuator which angles the lever bar upward and allows the back of the sliding door or window to bump up against the front end of the lever bar to then slide up as the sliding door or sliding window is slid opened. The secure locking device does not require any bolts or other permanent attachment means to the frame, and thus prevents marring of the door or window frame. The secure locking device is also easy to install as it just requires placing the secure locking device within the frame and using the adjustable bar on the main bar to fit within a frame if needed. The secure locking device is also easy to use and does not require any bending, as a user may use their foot to press the lever actuator to unlock or press the lock button to lock. Secure locking device also provides ease of mind as the sliding door is incapable of being opened while the secure locking device is positioned within the track and in the locked position. Thus, the secure locking device, as described in one or more non-limiting embodiments offers an improved method and device for adding a secondary lock to a sliding door or sliding window.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A device for securing and unsecuring a sliding panel along a track between a closed and an open position, respectively, the device comprising:

a main bar and a lever bar, wherein the main bar and the lever bar are each a rigid object with a uniform cross-section smaller than its length, wherein the lever bar is connected to the main bar at a connection point such that the lever bar pivots at the connection point, and the lever bar attaches to an endcap and a roller at an end opposite the connection point, the roller being secured within the endcap with an axel mechanism, wherein the roller slidingly rests against a sliding panel;

a locking mechanism integrated within the main bar to position the device in a locked and an unlocked position; and wherein the device is positioned within the track, wherein the device in the locked position secures the sliding panel in the closed position, and wherein the device in the unlocked position unsecured the sliding panel so that the sliding panel slides to the open position.

2. The device of claim 1, wherein the main bar is adjustable such that a length of the main bar is adjustable to allow the device to fit within varied sizes of sliding panels, and wherein the main bar has a telescoping adjustable bar that slidingly fits within the main bar to adjust the length of the main bar.

3. The device of claim 2, wherein the main bar is configured with a plurality of holes, wherein the adjustable bar is configured with a spring-loaded release button which engages with the plurality of holes to allow the length of the main bar to be adjusted.

4. The device of claim 1, wherein a hinge base is hingedly connected to the main bar at an end opposite an end with the connection point, wherein the device pivots upward at the hinge base.

5. The device of claim 4, wherein the hinge base is configured to securely sit within a track, wherein a bottom surface of the hinge base comprises of a first channel such that the hinge base clears a rail configured on the track.

6. The device of claim 1, wherein a bottom surface of the main bar is configured with a bumper, wherein the bumper is configured with a second channel such that the bumper clears a rail configured on a track.

7. The device of claim 1, wherein a lever actuator and a lock button are integrated onto the main bar, wherein the lever actuator and the lock button engage with each other to control the locking mechanism.

8. The device of claim 7, wherein the lever bar is integrated to the lever actuator at the connection point, wherein the lever bar and the lever actuator are connected to each other with a slight bend at the connection point so as not to lay in the same plane such that the lever bar and the lever actuator move relative to each other in a seesaw motion.

9. The device of claim 8, wherein depressing the lever actuator pivots the lever actuator and the lever bar at the connection point such that the lever bar pivots at an upward angle, wherein the pivoting upward of the lever bar unlocks the device such as to unsecure the sliding panel on the track.

10. The device of claim 9, wherein depressing the lock button locks the device to secure the sliding panel on the track, wherein the lock button is depressed and the lever bar is pivoted downward from the upward angle to lock the device.

11. The device of claim 7, wherein the locking mechanism comprises one or more latches and one or more latch sliders, wherein the one or more latches and the one or more latch sliders engage with each other, wherein the one or more latches are configured on the lever actuator and the one or more latch sliders are configured on the lock button.

12. The device of claim 11, wherein the lock button comprises:

a housing having two side walls and a back wall;

a first sliding piece and a second sliding piece enclosed between the housing and the lever actuator, wherein the second sliding piece is engagingly positioned below the first sliding piece, wherein:

the first sliding piece is configured with one or more guide rails which guide the first sliding piece upward and downward along one or more tracks configured on the two side walls of the housing for the one or more rails;

the second sliding piece configured with the one or more latch sliders slides backward and forward wherein the backward and forward movement engages or disengages with the one or more latches on the lever actuator to unlock or lock the device; and a compression spring connected to the second sliding piece and the back wall of the housing.

13. The device of claim 12, wherein to unlock the device and angle the lever bar upward the lever actuator is depressed which moves the one or more latches down to push on the one or more latch sliders causing the second sliding piece to slide backward till the one or more latches slip under the latch slider, and the compression spring moves the second sliding piece forward causing the one or more latches to hook under the one or more latch sliders and hold the lever bar in an upward angle position.

14. The device of claim 12, wherein the second sliding piece is configured with one or more actuation ramps and the first sliding piece has one or more guide ramps that correspond with an incline of the one or more actuation ramps, wherein the one or more guide ramps slide down over the one or more actuation ramps such that the second sliding piece moves backward to accommodate the downward movement of the first sliding piece and in doing so move the one or more latch sliders away from the one or more latches on the lever actuator; and the lock button is depressed to move the first sliding piece downward which disengages the one or more latch sliders from the one or more latches to pivot the lever bar downward from the upward angle position to lock the device.

15. The device of claim 1, wherein the endcap connected to the lever bar has a recessed section, wherein:

the roller rests against a sliding panel and allows the sliding panel to move along the track with the roller moving the device upward or downward with the sliding panel.

16. A device for securing and unsecuring a sliding panel along a track between a closed and an open position, respectively, the device comprising:

a main bar and a lever bar, wherein the main bar and the lever bar are each a hollow rigid object with a uniform cross-section smaller than its length, the lever bar is connected to the main bar at a connection point such that the lever bar pivots at the connection point;

wherein the main bar has a telescoping adjustable bar that slidingly fits within the main bar such that a length of the main bar is adjustable to allow the device to fit within varied sizes of sliding panels;

wherein the lever bar attaches to an endcap and a roller at an end opposite the connection point, wherein the endcap has a recessed section, and the roller is secured within the endcap with an axel mechanism, wherein the roller slidingly rests against a sliding panel; and a locking mechanism integrated within the main bar to position the device in a locked and an unlocked position;

wherein the device is positioned within the track, wherein the device in the locked position secures the sliding panel in the closed position, and wherein the device in the unlocked position unsecures the sliding panel so that the sliding panel slides to the open position.

17. The device of claim 16, wherein the main bar is configured with a plurality of holes, wherein the adjustable bar is configured with a spring-loaded release button which engages with the plurality of holes to allow the length of the main bar to be adjusted.

18. The device of claim 16, wherein a hinge base is hingedly connected to the main bar at an end opposite an end with the connection point, wherein the device pivots upward at the hinge base.

19. The device of claim 18, wherein the hinge base is configured to securely sit within the track, wherein a bottom surface of the hinge base comprises of a first channel such that the hinge base clears a rail configured on the track.

20. The device of claim 16, wherein a bottom surface of the main bar is configured with a bumper, wherein the bumper is configured with a second channel such that the bumper clears a rail configured on a track.

21. The device of claim 16, wherein a lever actuator and a lock button are integrated onto the main bar, wherein the lever actuator and the lock button engage with each other to control the locking mechanism.

22. The device of claim 21, wherein the lever bar is integrated to the lever actuator at the connection point, wherein the lever bar and the lever actuator are connected to each other with a slight bend at the connection point so as not to lay in the same plane such that the lever bar and the lever actuator move relative to each other in a seesaw motion.

23. The device of claim 22, wherein depressing the lever actuator pivots the lever actuator and the lever bar at the connection point such that the lever bar pivots at an upward angle, wherein the pivoting upward of the lever bar unlocks the device such as to unsecure the sliding panel on the track.

24. The device of claim 23, wherein depressing the lock button locks the device to secure the sliding panel on the track, wherein the lock button is depressed and the lever bar is pivoted downward from the upward angle to lock the device.

25. The device of claim 21, wherein the locking mechanism comprises of one or more latches and one or more latch sliders, wherein the one or more latches and the one or more latch sliders engage with each other, wherein the one or more latches are configured on the lever actuator and the one or more latch sliders are configured on the lock button.

26. The device of claim 25, wherein the lock button comprises:

a housing having two side walls and a back wall;

a first sliding piece and a second sliding piece enclosed between the housing and the lever actuator, wherein the second sliding piece is engagingly positioned below the first sliding piece, wherein:

the first sliding piece is configured with one or more guide rails which guide the first sliding piece upward and downward along one or more tracks configured on the two side walls of the housing for the one or more rails;

the second sliding piece configured with the one or more latch sliders slides backward and forward wherein the backward and forward movement engages or disengages with the one or more latches on the lever actuator to unlock or lock the device; and a compression spring connected to the second sliding piece and the back wall of the housing.

27. The device of claim 26, wherein to unlock the device and angle the lever bar upward, the lever actuator is depressed which moves the one or more latches down to push on the one or more latch sliders causing the second sliding piece to slide backward till the one or more latches slip under the one or more latch sliders, and the compression spring moves the second sliding piece forward causing the one or more latches to hook under the one or more latch sliders and hold the lever bar in the upward angle position.

28. The device of claim 26, the second sliding piece is configured with one or more actuation ramps and the first sliding piece has one or more guide ramps that correspond with an incline of the one or more actuation ramps, wherein:

the one or more guide ramps slide down over the one or more actuation ramps such that the second sliding piece moves backward to accommodate the downward movement of the first sliding piece and in doing so move the one or more latch sliders away from the one or more latches on the lever actuator; and the lock button is depressed to move the first sliding piece downward which disengages the one or more latch sliders from the one or more latches to pivot the lever bar downward from the upward angle position to lock the device.

* * * * *